Patented July 7, 1936

2,046,662

UNITED STATES PATENT OFFICE 2,046,662

MANUFACTURE OF SUBSTITUTE FOR NATURAL RUBBER

Francis J. J. van Cant, Batu Pahat, Johore, Straits Settlements

No Drawing. Application June 9, 1934, Serial No. 729,909

9 Claims. (Cl. 106—23)

This invention is a novel substitute for natural rubber and process of making and using same, and the principal object is to provide a substance having physical and chemical qualities similar to those of natural rubber and which may be produced at low cost.

The uses of natural rubber are well-known, and by reason of its peculiar qualities of extreme elasticity, non-conductiveness, et cetera, it is used commercially and industrially for many purposes which can at present be successfully and economically carried out by no other known substances.

Owing to the high price of rubber experiments have been made by investigators principally along two lines, first, to produce a substance having physical and chemical qualities similar to those of natural rubber but without using any natural rubber in its manufacture, and second, to produce such a substance by combining a quantity of natural rubber with other and cheaper materials. However, no successful results have as yet been achieved by either of such methods.

I will explain the invention to enable others to adopt and use the same, and will summarize in the claims the essential features of the invention for which protection is desired.

According to my present invention, hydrocarbons of the terpene group such as isoprene, camphene, pinene or the like, having an empirical formula of $C_5H_8$, or $C_{10}H_{16}$, or $(C_{10}H_{16})_n$, are treated with natural rubber latex, and I obtain a very good yield of a substance resembling natural rubber in its physical and chemical properties, and able to compete with natural rubber for industrial uses. In carrying out the reaction, appropriate emulsifying agents, solvents or diluents, or catalytic agents of neutral, alkaline, or acid character may be used.

Example 1.—100 parts of isoprene ($C_5H_8$) are emulsified with approximately 50 parts of water in which approximately 5 parts of gum tragacanth have been dissolved. Then approximately 100 parts of natural rubber latex are quickly added, and the whole vigorously stirred for from 2 to 5 minutes thereby forming a viscous sticky mass. Acetic or formic or hydrochloric acid is then incorporated in the mass drop by drop until the mass coagulates. This coagulated mass is then masticated between iron rollers for from 10 to 20 minutes producing a tenacious, elastic substance resembling natural rubber.

Example 2.—100 parts of camphene ($C_{10}H_{16}$) are emulsified with approximately 50 parts of water in which 5 parts of gum tragacanth have been dissolved. Then approximately 150 parts of natural rubber latex are quickly added, and the whole vigorously stirred for from 2 to 5 minutes producing a viscous sticky mass. Acetic or formic or hydrochloric acid is then incorporated in the mass drop by drop until the mass coagulates. The coagulated mass is then masticated between iron rollers for from 10 to 20 minutes producing a tenacious, elastic substance resembling natural rubber.

Example 3.—100 parts of pinene $(C_{10}H_{16})_n$ are emulsified with approximately 50 parts of water in which 5 parts of gum tragacanth have been dissolved. Then approximately 200 parts of natural rubber latex are quickly added, and the whole vigorously stirred for from 2 to 5 minutes producing a viscous sticky mass. Acetic or formic hydrochloric acid is then incorporated in the mass drop by drop until the mass coagulates. The coagulated mass is then masticated between iron rollers for from 10 to 20 minutes producing a tenacious, elastic substance resembling natural rubber.

I do not limit my invention to the exact proportions above stated, for obviously the same may be varied within the scope of the claims.

I claim:—

1. The process of producing a substitute for natural rubber, consisting in emulsifying a terpene hydrocarbon of the group consisting of isoprene, camphene and pinene, adding rubber latex and coagulating the mass.

2. The process of producing a substitute for natural rubber, consisting in emulsifying a terpene hydrocarbon of the group consisting of isoprene, camphene and pinene, adding natural rubber latex to the mixture to form a viscous mass, coagulating the mass and masticating the coagulated mass.

3. The process of producing a substitute for natural rubber, consisting in emulsifying a terpene hydrocarbon of the group consisting of isoprene, camphene and pinene, with a solution of gum, adding natural rubber latex to form a viscous sticky mass, adding an acid to coagulate the mass, and masticating the coagulated mass.

4. The process of producing a substitute for natural rubber, consisting in emulsifying a terpene hydrocarbon of the group consisting of isoprene, camphene and pinene, with a solution of gum tragacanth, adding natural rubber latex to the mixture to form a viscous sticky mass, coagulating the mass by adding an acid thereto, and masticating the coagulated mass.

5. The process of producing a substitute for natural rubber, consisting in emulsifying approximately 100 parts of a terpene hydrocarbon of the group consisting of isoprene, camphene and pinene with approximately 50 parts of a solution containing gum tragacanth; adding sufficient parts of natural rubber latex to the mixture to form a viscous sticky mass, coagulating the mass by slowly adding a coagulating agent thereto, and masticating the coagulated mass.

6. The process of producing a substitute for natural rubber, consisting in emulsifying 100 parts of a terpene hydrocarbon of the group consisting of isoprene, camphene and pinene with approximately 50 parts of a water solution containing approximately 5 parts of gum tragacanth, adding approximately 100 parts of natural rubber latex, stirring the mixture to form a viscous sticky mass, coagulating the mass by slowly adding an acid thereto drop by drop, and masticating the coagulated mass into a tenacious elastic substance.

7. A composition of matter for use as a substitute for natural rubber, consisting of the product of a terpene mixture of a hydrocarbon of the group consisting of isoprene, camphene and pinene, and natural rubber latex.

8. A composition of matter for use as a substitute for natural rubber consisting of the product of a mixture of an emulsion of a terpene hydrocarbon of the group consisting of isoprene, camphene and pinene and rubber.

9. The composition of matter produced by the process set forth in claim 1.

FRANCIS J. J. van CANT.